Sept. 30, 1958  J. T. BLACKMON, SR  2,853,822
ARTIFICIAL TREE
Filed Nov. 19, 1956
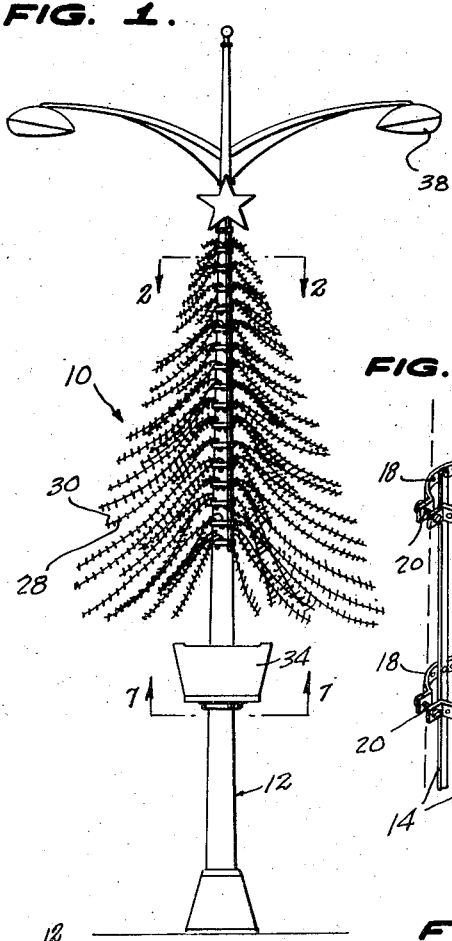
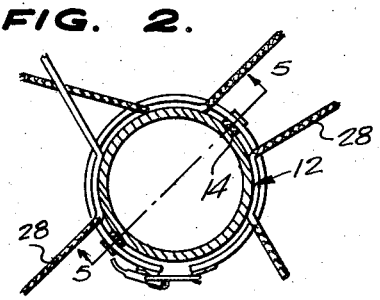
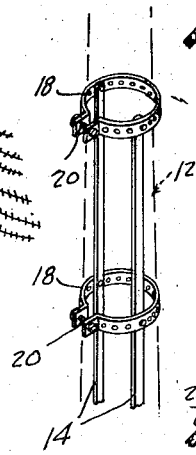
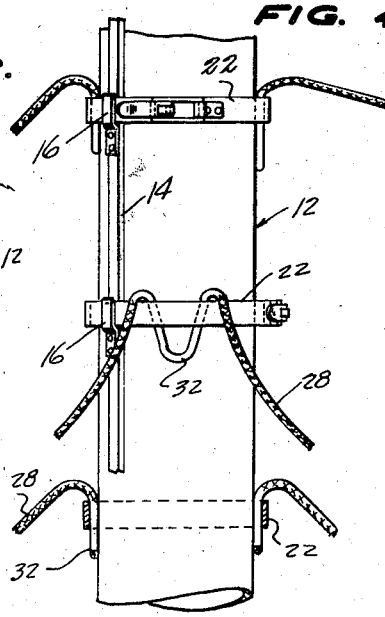
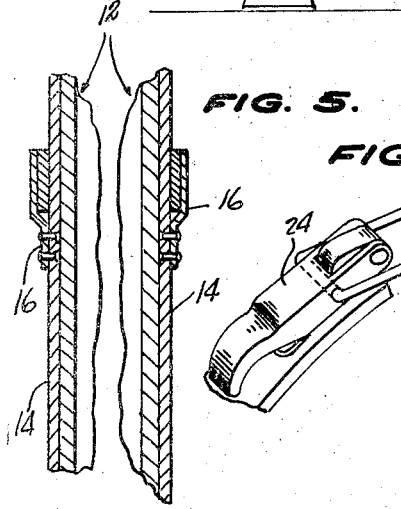
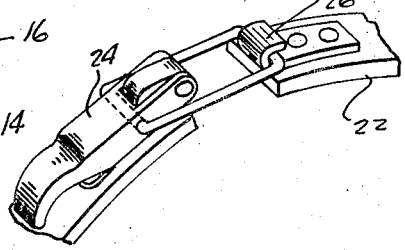
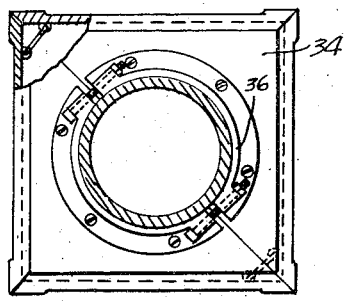
INVENTOR.
JAMES T. BLACKMON, SR.
BY
McMorrow, Berman & Davidson
ATTORNEYS.

United States Patent Office 2,853,822
Patented Sept. 30, 1958

2,853,822

ARTIFICIAL TREE

James T. Blackmon, Sr., Charlotte, N. C.

Application November 19, 1956, Serial No. 623,183

3 Claims. (Cl. 41—15)

This invention relates to artificial trees for use in decorating streets during holiday seasons.

An object of the present invention is to provide an artificial tree structure which lends itself to ready attachment to and detachment from a street light standard or other street utility pole.

Another object of the present invention is to provide an artificial tree structure for attachment to a street light standard which requires a minimum of time and labor to erect and dismantle by relatively unskilled labor and without the use of special tools.

A further object of the present invention is to provide an artificial tree structure for attachment to a street light standard which is sturdy in construction, one which is weatherproof, and when handled with a reasonable degree of care while being erected and dismantled for storage, is long-lasting.

These and other objects and advantages of the present invention will be fully apparent from the following description when taken in connection with the annexed drawing, in which:

Figure 1 is an elevational view of the artificial tree according to the present invention, Figure 2 is a sectional view on an enlarged scale taken on the line 2—2 of Figure 1, Figure 3 is a fragmentary sectional view of the means for securing the artificial tree to a street light standard, a portion of the standard being indicated in dotted lines, Figure 4 is an elevational view of a portion of the standard below the portion shown in Figure 3, showing the means, including straps and uprights for attaching the artificial branches or strips to the standard.

Figure 5 is a sectional view on an enlarged scale taken on the line 5—5 of Figure 2, a portion of the standard being broken away, Figure 6 is an isometric view of the cooperating elements on the ends of the straps shown in Figure 4, and Figure 7 is a view partially in section taken on the line 7—7 of Figure 1 and on an enlarged scale.

Referring in greater detail to the drawing in which like numerals indicate like parts throughout the several views, the artificial tree, according to the present invention, is designated in Figure 1 by the reference numeral 10 and is shown in combination with a street light standard designated generally by the reference numeral 12.

The tree 10 comprises a pair of uprights 14 positioned so as to abut against opposed points of the external surface of the standard 12. A plurality of saddle elements 16 are arranged in vertical spaced relation along each of the uprights 14 intermediate the upper and lower ends of the latter and are carried by the uprights 14.

As shown in Figure 5, the saddle elements 16 of one upright 14 are in horizontal alignment with the saddle elements 16 of the other upright 14, with all of the saddle elements 16 facing away from the standard 12.

Clamping means, each embodying a split band 18, extend about the portions of the uprights 14 between the uppermost aligned pair of saddle elements 16 and the upper ends of the uprights 14 and secure the uprights 14 in position on the standard 12. Each band 18 has a portion adjacent each end thereof turned outwardly with the outwardly turned portions arranged in face to face spaced relation and carrying a fastening element, such as a nut and bolt assembly 20, for securing the free end portions of each band 18 in encircling relation about the standard 12, as shown in Figure 3.

A horizontally disposed flexible ring member embodying a strap 22 extends about the parts of the uprights 14 adjacent each of the aligned pair of saddle elements 16 and is supported in the saddle elements 16. Cooperating latch elements 24 and 26 (Figure 6), are provided on the end portions of each strap 22 and releasably secure the strap 22 when seated in the aligned saddle elements 16 and encircled about the uprights 14 on opposed points of the standard 12.

A plurality of strips 28 each having a plurality of light reflective sprigs 30 extending therealong are arranged about each of the straps 22, so that the intermediate parts of the strips 28 are folded over, as at 32 in Figure 4, and supported on the adjacent strap 22 with the parts of the strips 28 between each of the ends thereof and the supported intermediate part 32 hanging from the strap 22 in the form of branches in pendant formation.

A box-like enclosure 34, constituting a shadow-box, is secured by a two-section ring 36 to the standard 12 at a point spaced below the lowermost one of the straps 22, and may be used to support therein a suitable number of floodlights for illuminating the lowermost portion of the tree 10.

In use, the tree 10 is readily attached to and detached from the standard 12 which may be a street light standard or pole having lamps 38 on its upper end and having its lower end fixed to a supporting surface. When attaching the tree 10 to the standard 12, first the uprights 14 are positioned in abutting relation on opposed points of the standard 12 and the bands 18, constituting clamping means, are positioned so as to extend about the portions of the uprights 14 adjacent the upper end of each of the uprights 14. The fastening elements or nut and bolt assemblies 20 are tightened to draw the end portions of the band 18 together and secure the uprights in position on the standard 12. Next, the straps 22, constituting flexible ring members, are seated in aligned saddle elements 16 on the uprights 14 and one or more of the strips 28 are positioned so that the intermediate part of each strip 28 is supported on the strap 22 with the parts of each strip 28 intermediate each end and the supported intermediate part 32 hanging from the strap 22 in the form of a branch in pendant formation. When illuminated, the sprigs 30 reflect the light and provide the tree with a decorative appearance suitable for a holiday decoration of a street.

My invention for which I seek Letters Patent is as follows:

1. The combination with a standard, of an artificial tree comprising a pair of uprights positioned so as to abut against opposed points on the external surface of said standard, clamping means extending about the portions adjacent the upper ends of said uprights and securing said uprights in position on said standard, a plurality of horizontally disposed flexible ring members arranged in vertical spaced relation and extending about and supported on the parts of said uprights between said clamping means and the lower ends of said uprights, and a plurality of strips each having a plurality of light reflective sprigs extending therealong arranged about each of said ring members so that the intermediate parts are folded over and supported on the ring member with the parts between each end and the supported intermediate parts hanging from the ring member in the form of branches in pendant formation.

2. The combination according to claim 1 which includes in addition a horizontally disposed open top boxlike light enclosure circumposed about the portion of said standard below the lower ends of said uprights, and another clamping means extending about said standard and engaging the bottom of said enclosure for holding the said enclosure in position on said standard.

3. The combination with a standard, of an artificial tree comprising a pair of uprights, a plurality of saddle elements arranged in vertical spaced relation along each of said uprights intermediate the upper and lower ends thereof and carried by said uprights, said uprights being positioned so as to abut against opposed points of the external surface of said standard with the saddle elements of each upright facing away from said standard, the saddle elements of the one upright being in horizontal alignment with the saddle elements of the other upright, clamping means extending about the portions of said uprights between the uppermost aligned pair of saddle elements and the upper ends of said uprights and securing said uprights in position on said standard, a horizontally disposed flexible ring member extending about the parts of said uprights adjacent each of the aligned pair of saddle elements and supported in said saddle elements, and a plurality of strips each having a plurality of light reflective sprigs extending therealong arranged about each of said ring members so that the intermediate parts are folded over and supported on the ring member with the parts between each end and the supported intermediate parts hanging from the ring member in the form of branches in pendant formation.

References Cited in the file of this patent

UNITED STATES PATENTS

| | | |
|---|---|---|
| 1,555,621 | Barker | Sept. 29, 1925 |
| 2,259,227 | Peroni | Oct. 14, 1941 |